(12) United States Patent
Collins et al.

(10) Patent No.: US 8,616,137 B2
(45) Date of Patent: Dec. 31, 2013

(54) EXTENDABLE TRAY FOR AN AIRCRAFT SEAT

(75) Inventors: Alexandra Collins, Geneva (CH); Mark Collins, Geneva (CH)

(73) Assignee: Airbus, Blagnac (FR)

( * ) Notice: Subject to any disclaimer, the term of this patent is extended or adjusted under 35 U.S.C. 154(b) by 364 days.

(21) Appl. No.: 13/062,397

(22) PCT Filed: Aug. 26, 2009

(86) PCT No.: PCT/FR2009/001034
§ 371 (c)(1),
(2), (4) Date: Mar. 4, 2011

(87) PCT Pub. No.: WO2010/029223
PCT Pub. Date: Mar. 18, 2010

(65) Prior Publication Data
US 2011/0156450 A1    Jun. 30, 2011

(30) Foreign Application Priority Data

Sep. 10, 2008  (FR) .................................. 08 56083

(51) Int. Cl.
*B64D 11/06* (2006.01)
(52) U.S. Cl.
USPC .............................. 108/44; 108/137; 297/135
(58) Field of Classification Search
USPC .............. 108/137, 143, 102, 90, 42, 44, 152;
244/118.6, 122 R; 248/279.1, 298.1;
297/144, 145, 135; 312/280–282, 304,
312/307
See application file for complete search history.

(56) References Cited

U.S. PATENT DOCUMENTS

| 2,805,904 | A |   | 9/1957  | Monroe et al.              |
|-----------|---|---|---------|----------------------------|
| 3,065,334 | A | * | 11/1962 | Hillenbrand et al. ....... 362/133 |
| 4,953,716 | A | * | 9/1990  | Rapoport .................. 211/107 |
| 5,421,646 | A | * | 6/1995  | McNamara et al. ........ 312/205 |
| 5,803,326 | A | * | 9/1998  | Krieger et al. ............. 224/275 |
| 6,375,119 | B2| * | 4/2002  | Park et al. ................ 244/118.5 |
| 7,007,614 | B2| * | 3/2006  | Gaunt et al. ............... 108/102 |
| 7,658,153 | B1| * | 2/2010  | Patoka ...................... 108/44 |
| 8,359,982 | B2| * | 1/2013  | Lebel et al. ................ 108/44 |
| 2001/0000639 | A1 |  | 5/2001 | Park et al.                |
| 2001/0003962 | A1 |  | 6/2001 | Park et al.                |

(Continued)

FOREIGN PATENT DOCUMENTS

EP     1 683 719       7/2006
WO   2008 031506      3/2008

OTHER PUBLICATIONS

Abstract and figure of KR 2004024370 to Chae et al.*

(Continued)

*Primary Examiner* — Janet M Wilkens
(74) *Attorney, Agent, or Firm* — Oblon, Spivak, McClelland, Maier & Neustadt, L.L.P.

(57) ABSTRACT

A tray table system to be mounted onto a seat, particularly in an aircraft, and to an associated aircraft, and a system that includes a retractable tray table having utility-surface dimensions that vary between a storage retracted position and an extended use position. The tray table system includes a tray table including an upper utility surface, and a translation mechanism capable of modifying by translation dimensions of the upper utility surface during movement of the tray table between at least a first general storage position and a second general use position.

12 Claims, 8 Drawing Sheets

(56) References Cited

U.S. PATENT DOCUMENTS

| | | |
|---|---|---|
| 2001/0015566 A1 | 8/2001 | Park et al. |
| 2006/0107877 A1* | 5/2006 | Sturt et al. .................. 108/44 |
| 2008/0035034 A1* | 2/2008 | Morita et al. ............... 108/143 |
| 2008/0250983 A1* | 10/2008 | Sundarrao .................. 108/44 |
| 2009/0223417 A1* | 9/2009 | Muirhead .................... 108/13 |
| 2010/0301162 A1* | 12/2010 | Hankinson ................. 244/118.6 |
| 2012/0133180 A1* | 5/2012 | Moulton et al. ............. 297/135 |

OTHER PUBLICATIONS

International Search Report Issued Nov. 24, 2009 in PCT/FR09/001034 filed Aug. 26, 2009.

* cited by examiner

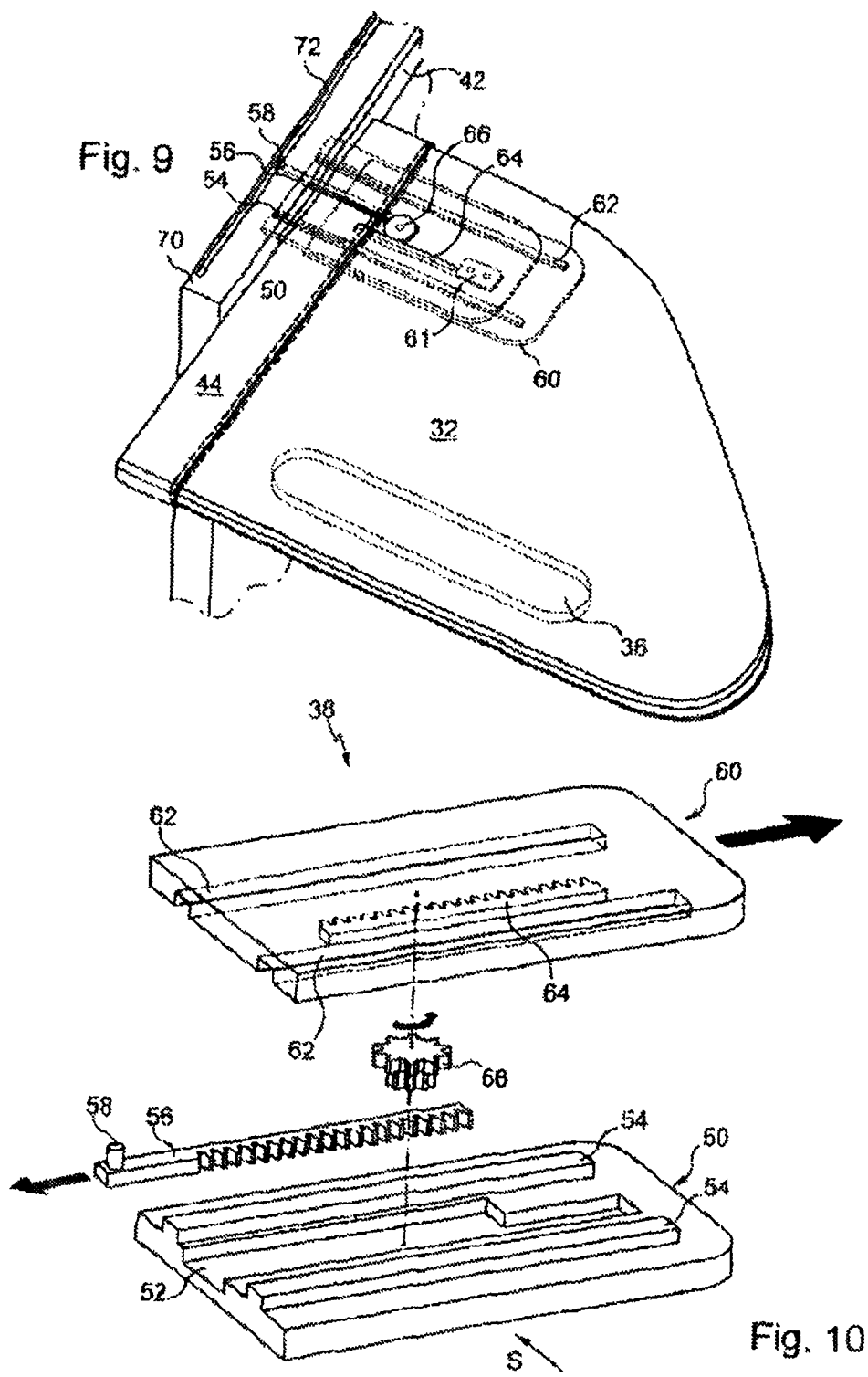

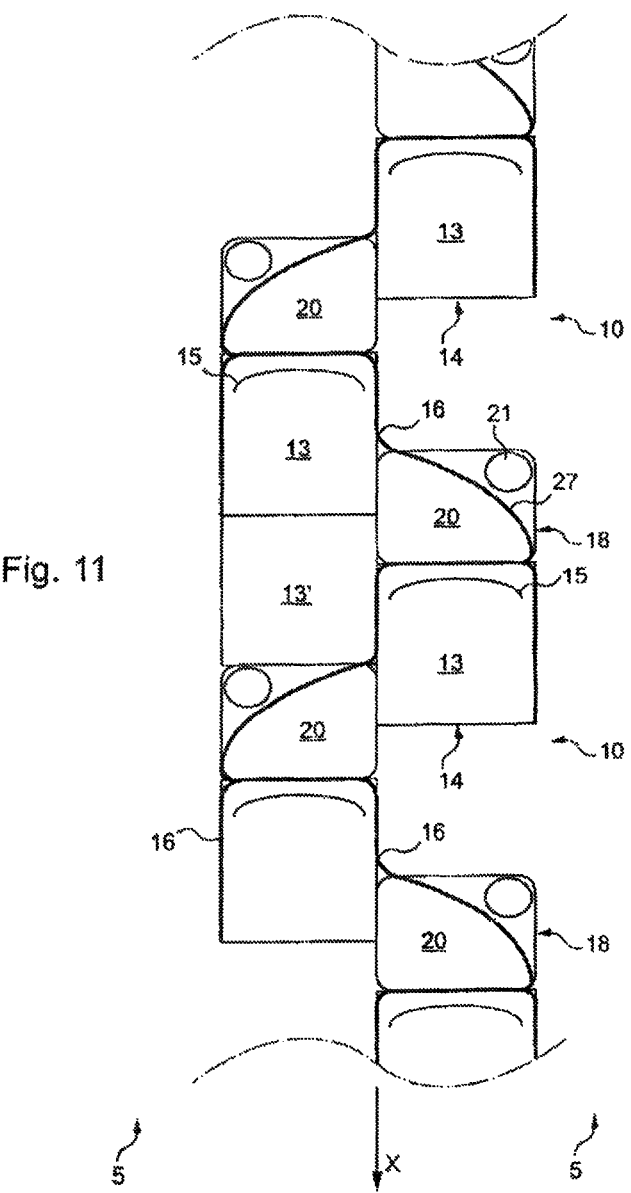

EXTENDABLE TRAY FOR AN AIRCRAFT SEAT

The present invention relates to a tray table system provided as equipment for a seat, especially of an aircraft, and to an associated aircraft, and more particularly to such a system comprising a retractable tray table whose useful surface dimensions vary between the retracted storage position and a deployed use position.

Traditionally the tray table presents a larger surface in deployed position than in retracted position, thus making it possible to improve the comfort of the passenger or of a user while limiting the space required for storage of the tray table.

Such tray tables are known in the form of tray tables having two parts capable of being folded one over the other by means of hinges, for example as in Patent FR 2905355.

The housings for storage of these folded tray tables are provided in particular in the armrests of the seats and are accessible by making the top part of the armrest tilt over. The tray tables are then stored in vertical position.

A disadvantage of these tray tables lies in the space necessary for manual unfolding of the two folded parts, generally a semicylinder described by the part of the tray table turning around the hinges. As this unfolding volume is not available in the storage housing, it is necessary to undertake complete retraction of the tray table from the housing before performing unfolding properly speaking. Thus the "useful" surface of the tray table is available only once all of the manipulations have been performed.

These manipulations are also not comfortable for the passenger: risk of pinching during folding of the tray table, risk of allowing the second part to drop during unfolding, causing unnecessary noise and impacts, necessity of achieving complete folding and storage in its housing when the passenger wishes to get up from his seat.

From publication EP 1683719, there is also known a pivoting airplane tray table provided on the back of a seat facing the passenger. This tray table is formed from two parts, one sliding inside the other.

The present invention seeks to alleviate at least one of the disadvantages of the prior art by proposing a new mechanism for deploying the tray table that ensures an increase of the "useful" surface of the tray table by simple manipulations that require little space.

To this effect, the invention applies in particular to a seat tray table system comprising a tray table having an upper use surface and being capable of being displaced along a longitudinal axis between at least two positions. The system additionally comprises translation means capable of modifying, by transversal translation relative to the longitudinal axis, the dimensions of the said upper surface during displacement of the said tray table between at least two positions.

In general, the first position is that of storage of the tray table in a storage housing, while the second position corresponds to that of use for the passenger. However, intermediate positions may be envisioned.

For the comfort of the passenger, the surface of the tray table is increased during its deployment and is reduced during its storage.

Thus, according to the invention, only one translation is employed to increase the "useful" upper surface of the tray table. On the one hand, part of the upper surface is accessible as soon as the tray table emerges from the storage housing, and not only at the end of the deployment operations. On the other hand, the translation ensures that the constituent elements of the tray table remain in the same plane, no element sweeping through a volume above the tray table. In this way the space requirement is reduced.

It is further noted that, since the upper surface of the tray table is accessible until it enters the storage housing, it is no longer necessary to clear the tray table in order to leave its seat: it is sufficient to push it as far as the entry of the housing, if this is provided at a good distance.

In particular, the translation effected according to the invention is parallel to the said upper surface, generally horizontal.

In one embodiment, the said translation means are coupled to means for displacing the tray table in such a way that the said upper surface extends automatically during displacement of the said tray table between the said two positions. By "coupling" here there is understood the fact that the translation means are automatically brought into action when the displacement means themselves are brought into action, generally by an action of the passenger, for example pulling the tray table toward himself.

This configuration takes advantage of the translation employed in the invention, since the extension of the upper surface can then be achieved synchronously with the displacement of the tray table towards its use position, in contrast to the unfolding of the prior art, which necessitates two successive movements for lack of space in the housing.

By judicious choice of the profile of extension of the tray table according to its deployment, in such a way as to conform as closely as possible to the contours of the storage housing, it is possible to guarantee optimum use of the tray table during all manipulations thereof.

In particular, the translation means comprise a finger capable of engaging in a groove provided on a support, along which the said tray table is displaced between the said two positions. In this way, by adapting the track of the groove, it is easy to actuate the translation in proportion to the displacement of the tray table between the said two positions. In this way the finger and the groove contribute to the coupling of the translation means with those for displacement of the tray table.

According to a particular characteristic of the invention, the said tray table comprises a first tray table part and a second tray table part integral with the said means for displacing the tray table along a support, the said first part of the tray table coming to slide in the second part of the tray table.

It therefore is understood that the first part, under the action of the translation means, emerges from (or, as the case may be, goes back into) the other part in which it can be partly stored. The upper surface of the tray table then results from addition of the upper surface of the second part to the upper surface of the first part in emerged position.

In particular, the said second part has width substantially equal to the translation travel. In this way the plane upper surface formed by the first part is maximized. By way of example, the upper surface of the second part, which is generally higher than the upper surface of the first part, may comprise cup holders.

According to a relatively simple embodiment of the translation mechanisms, the said translation means comprise two racks coupled by a toothed wheel, the two racks being respectively integral with a movable part of the tray table and with an actuating means. In this case the movable part of the tray table is movable relative to the part of the tray table fixed to the displacement mechanisms.

In this way, when the second rack is actuated, the first rack is displaced, and with it, the movable part of the tray table (generally the first part hereinabove, which then emerges from the second part).

This embodiment makes it possible easily to adapt the travel of the movable part of the tray table according to the available storage space. In fact, starting from a given lateral travel of the second rack, or in other words without changing actuating means, it is possible to choose toothed wheels having ratios that are variable according to the desired uses.

In particular, the said actuating means comprises the said finger, with the finger such as presented hereinabove. In this way, by pulling the tray table from its storage housing, the finger is displaced by the groove, entrains the first rack and in turn deploys the movable part of the tray table. In this specific case, the said toothed wheel is mounted on a second tray table part integral with means for displacing the tray table along a support, the said movable part of the tray table coming to slide in the second part of the tray table.

As a variant of the mechanism with two racks, it is possible to provide that the finger is mounted integrally with the movable part of the tray table. In this case, the travel of the tray table is limited to the lateral travel of the finger in a groove provided on the support.

In one embodiment, the system comprises means for displacing the said tray table along a seat support, the said displacement means comprising at least one rail on the said support and one mobile element integral with the said tray table and capable of sliding on the said rail.

According to a particular characteristic of the invention, the tray table is fixed to displacement means in such a way that the upper surface of the said tray table occupies a substantially horizontal position in the said two positions.

By virtue of this arrangement, the tray table may be maintained horizontally throughout the entire deployment travel. That makes it possible on the one hand to use simple mechanisms for displacement between the two positions of storage and use, and on the other hand to be able to use the tray table or the extracted part of the tray table as soon as it begins to emerge from the storage housing.

Thus the passenger can leave his seat without clearing his tray table, simply by pushing the tray table as far as the entry to its housing.

In particular, it is possible to provide that the tray table is capable of assuming at least one intermediate position between the said first and second positions. Because the tray table is in horizontal position at every point of its displacement, the intermediate position or positions can constitute positions of use of the tray table.

According to a particular embodiment, the system comprises means for guiding the said tray table during its deployment, the said guiding means being arranged to displace the said upper surface vertically between the said two positions. In particular, it is intended that the retracted position will be higher than the deployed position. Depending on the storage location, for example facing the passenger, the high retracted position ensures a comfortable space for the passenger's legs, while the low deployed position can correspond to an optimum of comfort for its use by a seated passenger.

In one embodiment, in one of the positions, the tray table, referred to here as extendable, is stored in a housing provided in a cabinet having a fixed tray table on its upper surface, the said extendable tray table having dimensions substantially identical to the said fixed tray table, in such a way that the tray table is underneath the fixed tray table in stored position. In this way the space used by the said cabinet is optimized: it proposes a fixed upper tray table and accommodates the stored extendable tray table, whose useful surface is as large as possible while being sure of being completely hidden (by the fixed tray table) in stored position.

In one embodiment, in which, in one of the positions, the tray table is stored in a housing that allows at least part of the lower surface of the tray table to be accessible, and the said tray table comprises gripping means machined in the said part of the lower surface in such a way that a user is able, with the gripping means, to actuate the said tray table stored in the housing. The gripping means may consist in particular of an oblong blind hole machined in the thickness of the tray table.

The invention also applies to a seat module and an aircraft comprising a system such as presented hereinabove.

Optionally, the aircraft may comprise means relating to the system characteristics presented hereinabove.

Other features and advantages of the invention will become more apparent in the description hereinafter, illustrated by the attached drawings, wherein:

FIGS. 8 and 9 illustrate an example of the mechanism for extending the removable tray table, in retracted position and in extended position respectively;

FIG. 10 is an exploded view of the extending mechanisms of FIGS. 8 and 9; and

FIG. 11 shows another example of a cabin configuration for employment of the seat modules and tray tables according to the invention.

Figure 1:
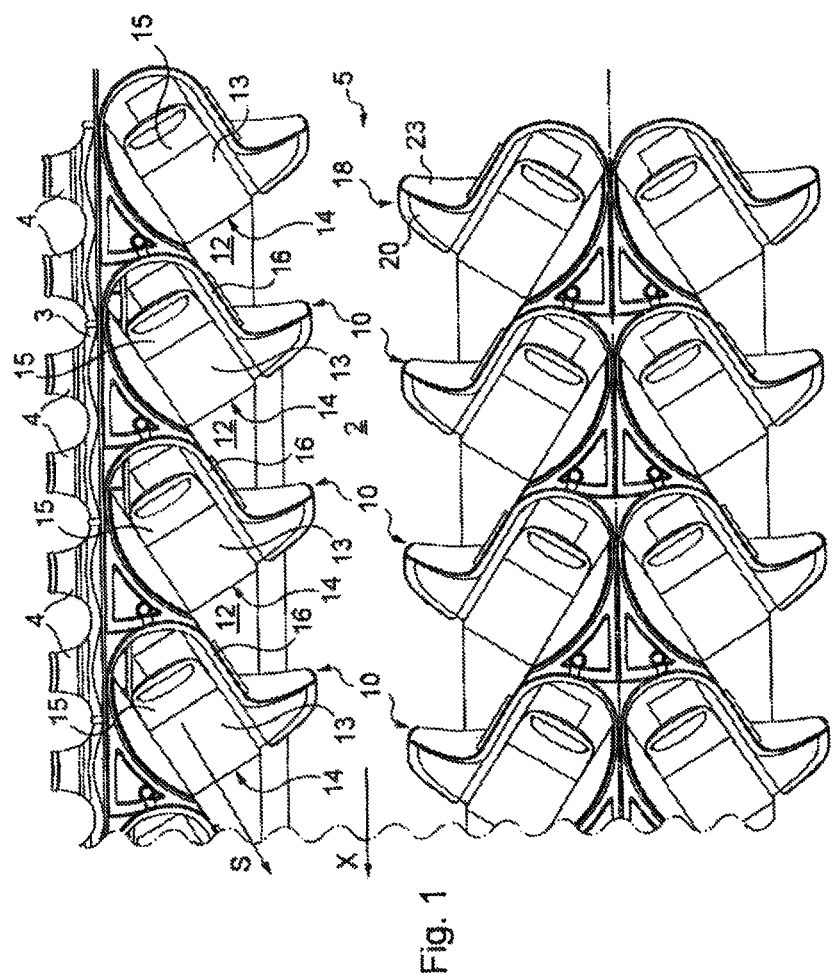
FIG. 1 is a schematic overhead view of an assembly of seat modules with which an aircraft cabin is equipped.

Referring to FIG. 1, there will first be described an aircraft cabin arrangement according to one embodiment of the invention.

As partly shown in FIG. 1, an aircraft cabin 1 is provided with a floor 2, lateral walls only one of which 3 provided with windows 4, is shown, as well as a ceiling, not shown for reasons of clarity.

The cabin is provided with a plurality of seat modules, denoted by general reference 10, making it possible to create a place for each passenger of the aircraft.

Each module 10 is provided with a seat 14 and a separation panel 16 defining a personal space 12 for the passenger.

As clearly illustrated in FIG. 1, different passenger seat modules are installed, specifically modules 10 disposed along wall 3 of the cabin and modules 10 disposed in the central part of the cabin.

In this central part, seat modules 10 are installed in pairs, for example.

Between the central part of the cabin and wall 3 of the cabin, seat modules 10 are placed on both sides of an aisle 5, provided in the cabin for circulation of passengers and on-board personnel.

Furthermore, as clearly illustrated in FIG. 1, seat modules 10 are arranged in staggered relationship relative to one another on both sides of aisle 5. This arrangement makes it possible to enhance the masking effect produced by separation panels 16.

A seat column along longitudinal axis X of the aircraft is formed by seat modules 10 arranged side-by-side in longitudinally offset relative position (or in other words relative to their own longitudinal axis S). Longitudinal axis S of seat modules 10 forms an acute angle with longitudinal axis X of the aircraft, preferably an angle between 15° and 45°, for example 30°, making it possible to increase the number of seat modules 10 integrated in a given length of aircraft.

For the remainder of the description, the terms "front" and "rear" will refer to longitudinal axis X, to denote in particular a passenger or a seat module 10 relative to a neighboring passenger or seat module 10 along this axis.

In each seat module 10, seat 14 itself is provided with a seat bottom 13 and a back 15, oriented according to axis S, so that in traditional manner the passenger can be seated in seat 14.

In FIG. 1, each seat is in upright position, back 15 of seat 14 therefore extending substantially vertically relative in particular to floor 2 of the aircraft.

Of course, this upright position of seat 14 also encompasses the intermediate seat positions in which back 15 is slightly inclined relative to seat bottom 13, for example at an angle of 20 to 30° relative to the vertical.

Figure 2A:
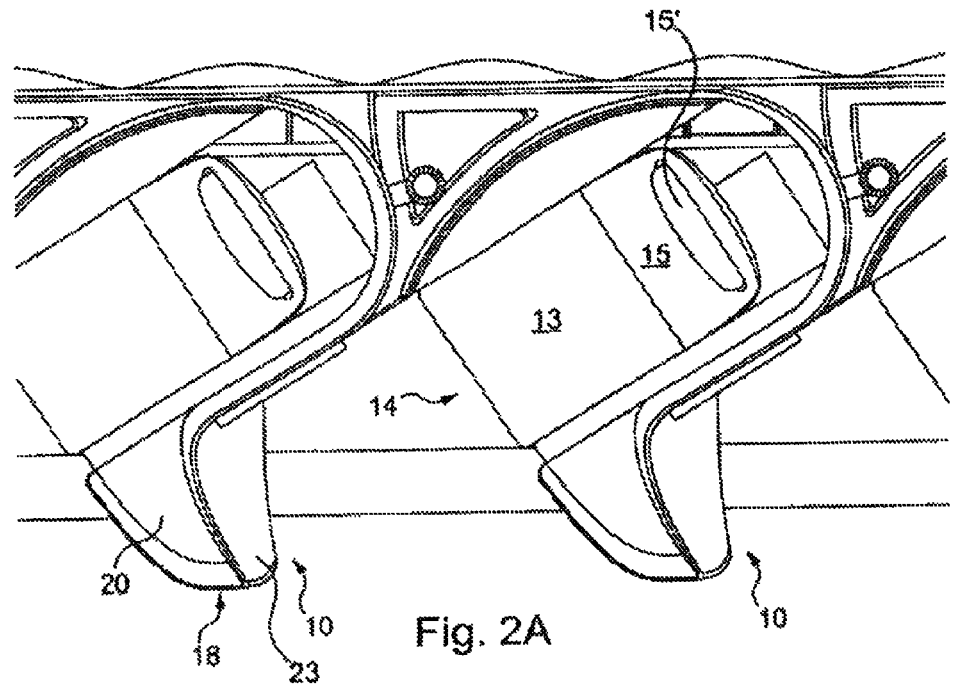
FIG. 2A illustrates an overhead view of a seat module in accordance with one embodiment of the invention, the seat being in upright position.
Figure 2B:
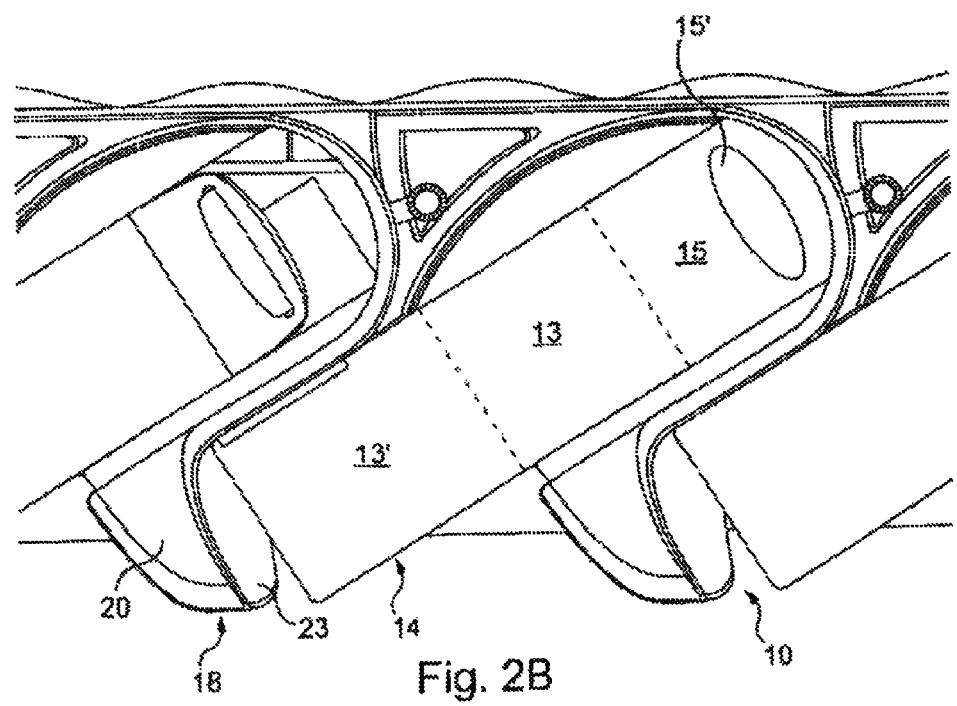
FIG. 2B is a view similar to FIG. 2A, the seat being in reclining position.

FIGS. 2A and 2B illustrate a seat module 10 in greater detail, each seat 14 being movable between an upright position (FIG. 2A) and a reclining position (FIG. 2B).

The mechanism permitting seat 14 to move from upright position to reclining position and vice versa is not illustrated in the figures. This mechanism may be any mechanism whatsoever, familiar to the person skilled in the art, permitting the position of the seat to be modified.

In particular, in the reclining position, back 15 of seat 14 extends in a substantially horizontal position, substantially in the same plane as seat bottom 13 of the seat.

As clearly illustrated in FIGS. 2A and 2B, back 15 is preferably provided with a headrest 15', constituting a cushion for the head of the passenger reclining on seat 14 when the seat is in reclining position.

When seat 14 is in reclining position as illustrated in FIG. 2B, it therefore constitutes a bed for the passenger.

In order to increase the length of this bed, seat 14 may be additionally provided, in the extension of seat bottom 13, with a leaf 13', adapted to be displaced between a folded, substantially vertical position when seat 14 is in upright position, and a reclining position, substantially in the same horizontal plane as seat bottom 13 and back 15 of seat 14 when the latter is in reclining position.

Figure 3A:
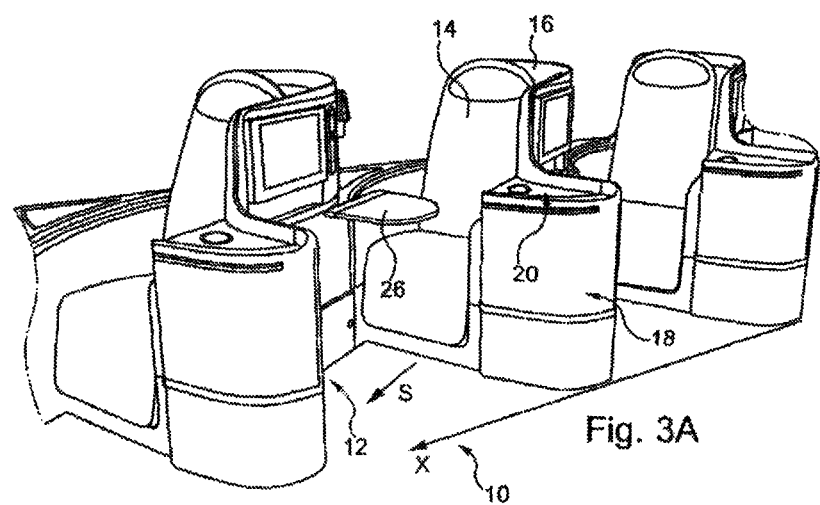
FIGS. 3A and 3B are views in elevation of a column of seat modules in an arrangement similar to that of FIGS. 2A and 2B respectively.
Figure 3B:
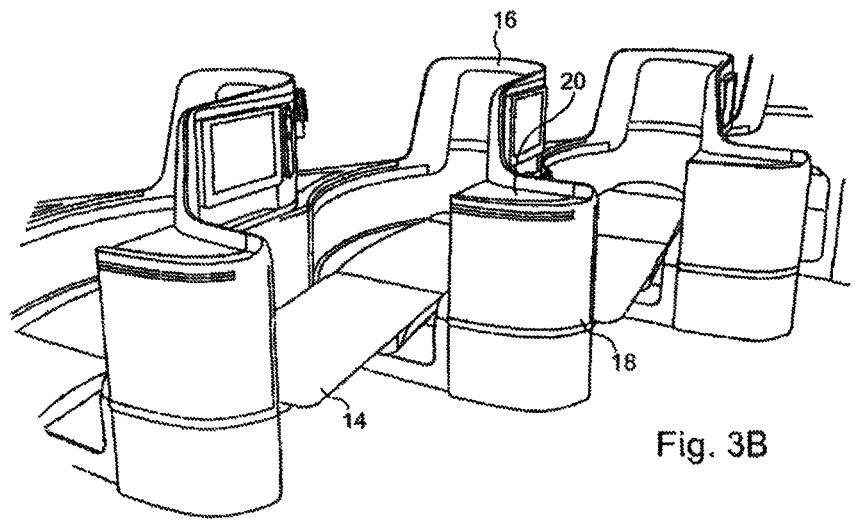

As illustrated in FIGS. 3A and 3B, the separation panel or rigid body 16 in each seat module 10 surrounds seat 14 on its sides and rear, and it ends on one of the sides in the form of a casing 18 or vertical cabinet, topped by a fixed tray table 20 available to the passenger.

The front part of personal zone 12 is bounded, facing seat 14 along axis S, by the rear of casing 18 of the front module, and, on the side opposite rear casing 18, by body 16 of front module 10. The other side of the front part is left free in such a way as to provide access to seat 14 and to personal space 12.

It will be noted here that, because of the relative offset between seat modules 10, fixed tray table 20 is easily accessible for the front passenger, close to seat bottom 13 in particular, whereas, for the rear passenger, the corresponding casing is farther away, close to his feet, and therefore of little practical use.

Figure 4:
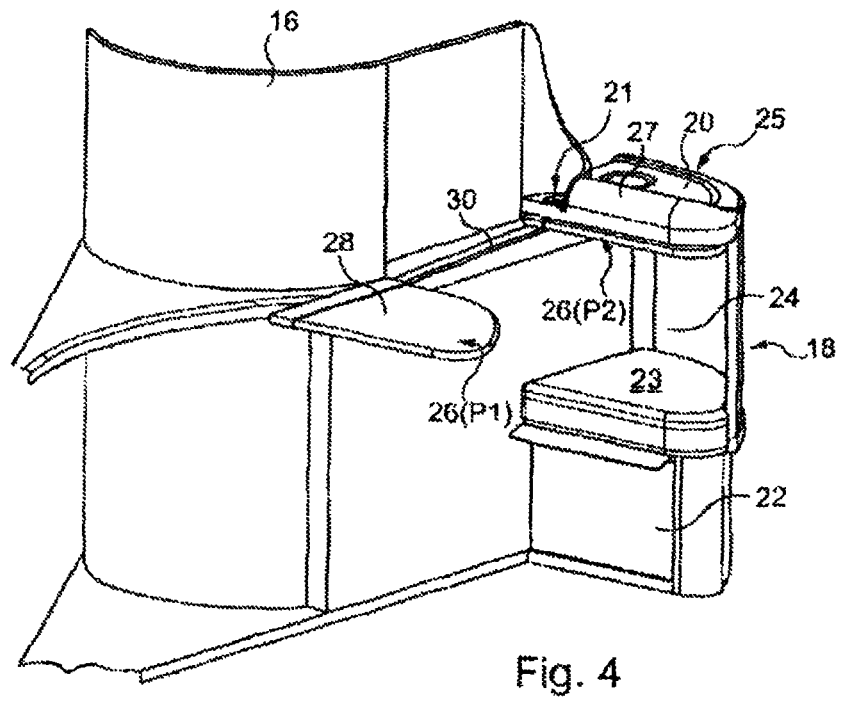
FIG. 4 shows an assembly made up of a seat module of FIG. 3, integrating a removable tray table.

As illustrated in FIG. 4, casing 18 bounding the front part of zone 12 comprises a low zone 22, an intermediate zone 24 and a high zone 25.

Low zone 22 is hollow, forming a storage space for the rear passenger, closed by a sliding door, probably provided with a lock.

Intermediate zone 24, hollow, also forms a storage space for the rear passenger when seat 14 is in raised upright position or a space to accommodate the feet of the rear passenger when seat 14 is in reclining position. Lower surface 23 in this housing 24 then constitutes a surface for supporting the feet of the rear passenger.

In reclining position, seat 14 is substantially coplanar with surface 23, while the end of leaf 13' coming to bear, for example, on the edge of surface 23.

High part 25 of casing 18 defines, as explained in the foregoing, a fixed tray table 20 used by the front passenger. A separation molding 27, extending vertically over a few centimeters and along the periphery of tray table 20 facing the rear passenger, makes it possible to conceal the contents of this fixed tray table 20 from the eyes of the rear passenger.

High part 25 of the casing comprises, as the case may be, a portion 21 of the fixed tray table for the rear passenger, for example to set down a cup or a bottle. In this case, the two fixed tray tables 20 and 21 are separated by vertical separation molding 27.

In the example of FIG. 4, high part 25 of casing 18 has dimensions, in the horizontal plane, identical to those of surface 23 for foot support. In this way the use of the front part of seat module 10 is optimized by furnishing the largest possible surface for fixed tray tables 20 and 21.

Alternatively, as illustrated in FIGS. 1, 2A and 2B, high part 25 comprises only a fixed tray table 20 for the front passenger and has horizontal dimensions smaller than those of surface 23. In particular, the depth of high part 25 parallel to axis S is reduced compared with the corresponding depth of surface 23.

Thus the latter surface 23 juts out partly beyond casing cabinet 18. This jutting out part of surface 23 may be used, when seat 14 is in upright position, as a supplementary seat bottom for another passenger facing seat 14 in module 10. The molding of high part 25 facing seat 14 may then be used as a backing for the other passenger seated on supplementary seat bottom 23 formed in this way.

In bed configuration, this jutting out part of surface 23 receives, in supporting manner, leaf 13' to form the bed (see FIG. 2B).

For the purpose of clarity in these figures, the references are provided only for a limited number of modules (10) shown, even though all modules of the cabin are equipped with corresponding elements.

The explanations hereinafter concerning the retractable tray table may be applied without distinction to either one of these two variants.

There has been shown in FIG. 3A a retractable tray table 26 (not shown in FIGS. 1, 2A and 2B, but provided in these configurations) in deployed position, or in other words overhanging at least part of seat bottom 13 of seat 14 for optimum use by the corresponding passenger. In FIG. 3B, retractable tray table 26 is in its stored position (not visible).

There has been shown in FIG. 4 tray table 26 in its two extreme positions, namely completely deployed position P1 for optimum use by the seated passenger (same as FIG. 3A) and completely stored position P2, in which tray table 26 is housed in the high part of housing 24 and fastened underneath fixed tray table 20 (and as the case may be underneath fixed tray table 21 when it is provided).

Tray table 26 in position P2 and fixed tray table 20 (or high part 25) have similar horizontal dimensions, such that removable tray table 26 disappears completely into casing 18 in stored position.

In these two positions P1 and P2, retractable tray table 26 has a horizontal upper surface 28. In position P1, this upper surface 28 constitutes the table traditionally used by a passenger.

A mechanism for displacing tray table 26, represented here by a rail 30 carried by "front" body 16 substantially in longitudinal direction S, makes it possible to change from one position to the other, and even to assume an intermediate position, by translation of tray table 26 along the rail. Upper surface 28 is then kept horizontal throughout the entire displacement. Thus the passenger is able to get out of his seat simply by pushing retractable tray table 26 into an intermediate position toward casing 18, without having to clear his items from tray table 26.

Retractable tray table 26 according to the present invention is special in that, when the tray table is displaced in the longitudinal direction, its upper surface 28 becomes longer or shorter by transversal translation of its elements. Then, in position P2, it has an upper surface 28 of smaller dimensions than in position P1. Thus tray table 26 occupies less space during storage and furnishes a larger "useful" surface for use by the passenger.

In this way modules 10 are less broad in the direction perpendicular to X and aisles 5 of the aircraft are therefore more spacious. It is noted here that, since casing 18 is therefore less broad than seat bottom 13 of seat 14, leaf 13', once unfolded to form a bed, may jut out beyond the casing, as is evident from FIG. 2B, without creating any inconvenience in aisles 5.

Figure 5:
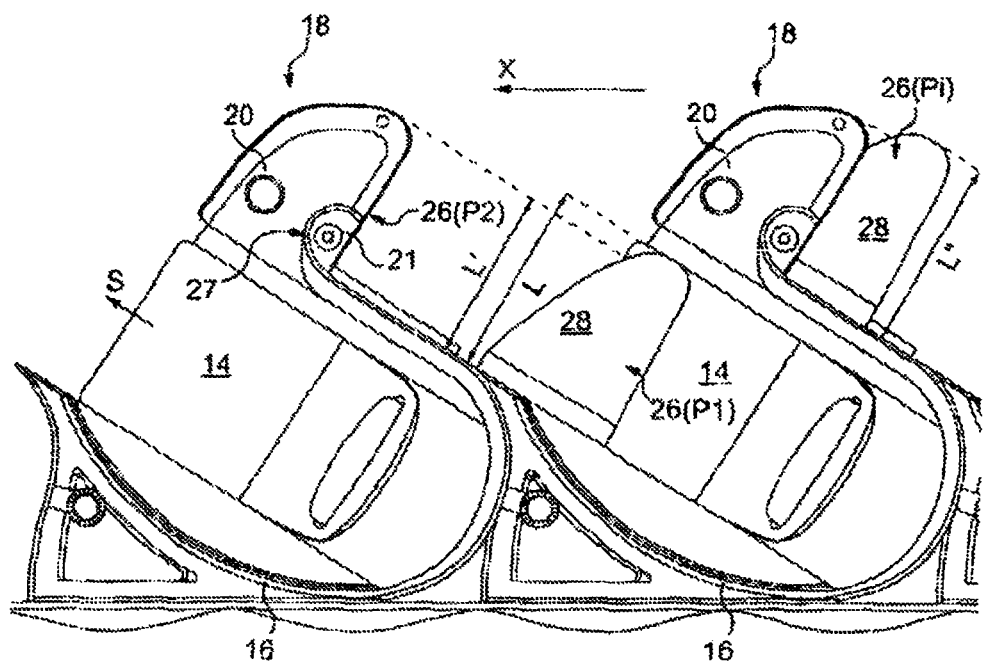
FIG. 5 is an overhead view of seat modules illustrating the tray table of FIG. 4 in different positions.

Referring to FIG. 5, retractable tray table 26 has a width L in position P1 (horizontal dimension perpendicular to direction S, or in other words the width seen by the passenger) substantially equal to that of seat 14 (and of seat bottom 13).

Casing 18 and retractable tray table 26 in position P2 have a width L', smaller than L, for example three to ten centimeters less, especially five.

A retractable tray table 26 in intermediate position Pi, in which upper surface 28 has partly emerged from housing 24 provided for its storage, also has been shown. Tray table 26 may already be used in this position Pi, for example as a cocktail tray table for storing glasses.

Other intermediate positions Pi may be provided along the path between P1 and P2, for example an intermediate position, in which the passenger is able to get out of the seat as mentioned in the foregoing, and in which upper surface 28 is completely out of housing 24.

In the position Pi shown, the width L" of retractable tray table 26 is between L' and L. As will be seen hereinafter, different profiles governing the width of tray table 26 may be envisioned according to the degree of extraction of tray table 26 from its housing 24.

To optimize the usable surface of tray table 26, there is preferably chosen a profile that ensures that the width of tray table 26 assumes the maximum value L as soon as all of upper surface 28 is extracted from housing 24.

Figure 6:
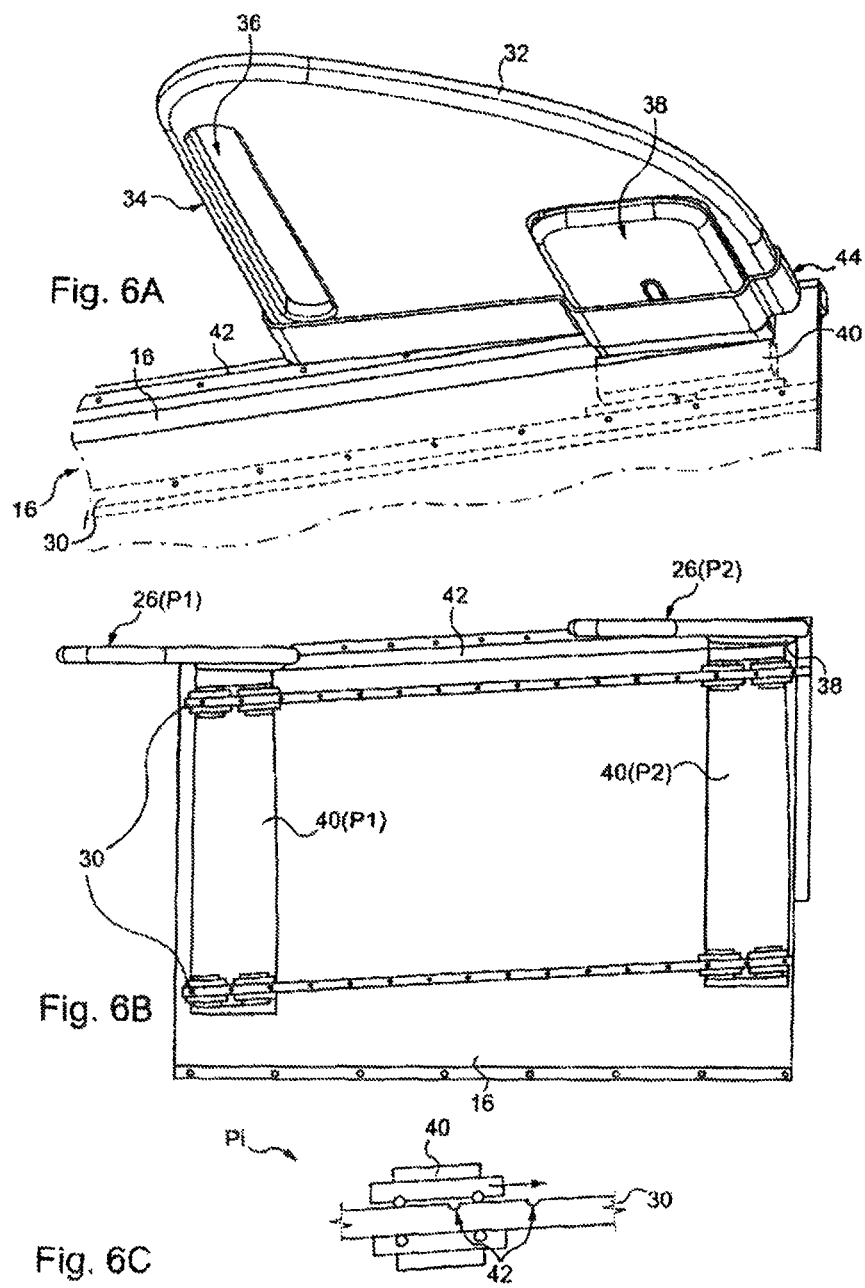
FIG. 6A is a view from underneath of the tray table of FIG. 4, partly showing the means for displacing the tray table.
FIG. 6B illustrates means for displacing the tray table between different positions of use.
FIG. 6C illustrates a means for locking the tray table in position.
Figure 7:
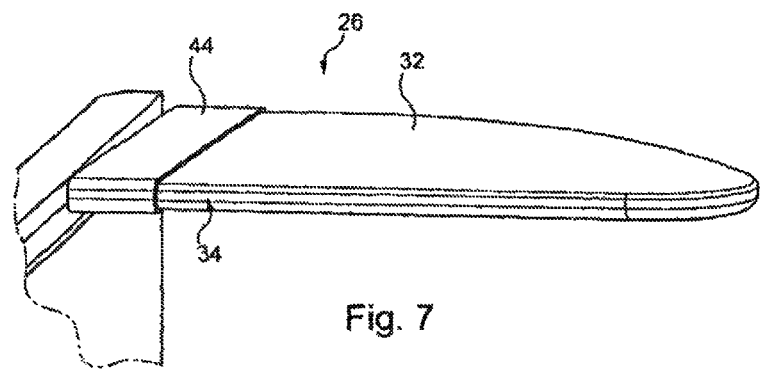
FIG. 7 shows an example of the general structure of the tray table according to the invention.

The displacement of tray table 26 between positions P2 and P1 now is illustrated with the aid of FIGS. 6A to 6C.

Referring to FIG. 6A, retractable tray table 26 comprises a main top 32 of reduced thickness, for example less than two centimeters, which has a straight edge 34 extending over a large portion of the width of the tray table on the passenger side. From the side of this straight edge 34, the rear part of main top 32 extends along a curve toward external body 16, which comes to support tray table 26 and its displacement mechanism.

Casing 18 has a shape substantially similar to that of main top 32, in such a way that, in stored position P2, tray table 26 conforms to the interior shape of casing 18.

In its lower face, main top 32 has a blind hole 36 of oblong shape extending parallel to edge 34 and acting as a handle for the passenger who wishes to pull or push tray table 26. The positioning of tray table 26 stored in the upper part of housing 24 guarantees that the passenger can easily access handle 36.

Any other gripping means that permits the passenger to displace tray table 26 may be envisioned.

Referring now to FIG. 6B, top 32 is fixed to means for displacement by translation along one or more rails 30, in this case to a rigid cassette 38 parallel to the plane of top 32, itself fixed laterally to a mobile element 40 on rail 30, in this case a kind of traveler that slides or rolls on two rails. The displacement travel of the tray table between P1 and P2 is a few tens of centimeters, generally between fifty centimeters and one meter, particularly between 75 and 80 cm, to offer a comfortable personal space 12 for the passenger.

The fixation of tray table 26 across cassette 38 makes it possible to minimize the space occupied underneath the tray table by the displacement mechanisms and therefore to increase the comfort of the passenger in space 24.

Under the pulling or pushing force exerted by the passenger on handle 36 along axis S, mobile element 40 slides on rails 30, making it possible to displace tray table 26 integral therewith between the different positions P1, P2 and Pi.

Rails 30 and mobile element 40 are housed in the thickness of body 16, in this case constituted by a double wall, for example, A straight slot 42 is therefore provided for the passage of cassette 38 along the displacement between P1 and P2.

Any means of retaining mobile element 40 in one of the positions Pi may be provided. For example, in FIG. 6C, shallow recesses 42 are machined in rails 30 at appropriate locations. Wheels provided on mobile element 40 can then be engaged in these recesses 42, blocking tray table 26 in the said positions Pi.

The force exerted by the passenger on handle 36 makes it possible, as the case may be, to disengage the mobile element from these recesses in order to displace tray table 26 to another position.

Thus recesses are provided at positions P1 and P2 as well as at a cocktail position P3, in which tray table 26 is partly (by approximately half) emerged from housing 24, and at a position P4 midway between P1 and P2, in which the passenger can easily get out of his seat.

As a variant, the retaining means may be of friction type, provided on rolling bearings of mobile element 40 in such a way that tray table 26 may assume any position whatsoever along rails 30. and no longer only those created by recesses 42. The friction means ensure locking of tray table 26 in position until a force greater than a resistance threshold is applied to the tray table.

Appropriate means for locking tray table 26 in these different positions may also be provided, especially a manual latch locking retractable tray table 26 in position P2 (to prevent untimely emergence during takeoff of the aircraft, for example).

As illustrated in FIG. 6B, rails 30 and slot 42 are slightly inclined downward from stored position P2 to optimum use position P1. The level difference between P2 and P1 is a few centimeters, especially three or four centimeters.

This level difference makes it possible to combine both a low height P1 that is optimum for a seated passenger and a high height P2, in which retractable tray table 26 "sticks" as close as possible to fixed tray table 20, in such a way as to maximize the space of volume 24 to accommodate the feet of the passenger in lying-down position or to make a larger storage space available.

Thus cassette 38 is fixed to mobile element 40 which supports it, with an angle similar to that of the inclination of rails 30 relative to the floor (defining the horizontal), in such a way that tray table 26 remains horizontal throughout its entire displacement. In this way it is possible to use tray table 26 according to the invention even when it is hardly (partly) emerged from housing 24.

Referring to FIGS. 7 to 10, the mechanism for extending retractable tray table 26 when it is pulled out of housing 24 now is described.

Retractable tray table 26 is formed from main top 32 as shown hereinabove and from a cover 44 extending over the part of tray table 26 adjacent to body 16 along which it is displaced.

Cover 44 is formed from a rigid plastic strip of small thickness encircling the edge of main top 32 and cassette 38 attached and partly fixed (as will be seen hereinafter) underneath main top 32 (see FIG. 6A also). Strip 44 is fixed, for example by riveting, to a lower box of cassette 38.

Figure 8:
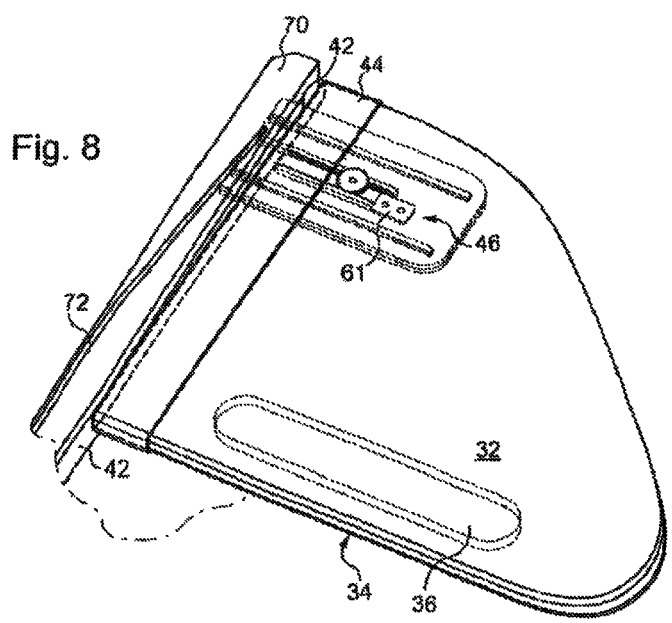

Cover 44 is not fixed to top 32, so that this top is free to slide into the interior, especially between a retracted position (as illustrated in FIGS. 6A and 8—edge of top 32 in dashed lines) corresponding in general to position P2, and an extended position (illustrated in FIG. 9—edge of top 32 in dashed lines) corresponding to the tray table in position P1.

It is this translation of top 32 by sliding in cover 44 that permits tray table 26 to have a useful upper surface 28 (comprising the upper surface of strip 44 and the upper surface of top 32) of variable dimension.

In order to guarantee a continuous upper surface 28 between strip 44 and top 32, there is chosen a strip 44 of width at least equal to the lateral travel envisioned for top 32. This travel corresponds in particular to the difference L-L', or in other words five centimeters, for example. In particular, the strip width is chosen to be equal to this travel, in such a way that, in extended position, the left lateral edge (in the figure) of top 32 is perpendicularly flush with the right edge of strip 44. In this way the usable surface of top 32 in completely deployed position P1 is maximized.

To improve the planarity of upper surface 28, it is then possible to provide elastic means, such as springs provided between cassette 38 and top 32 in order to raise the latter by the thickness of strip 44 when the tray table is extended. In this way the upper surfaces of top 32 and of cover 44 are at the same level. It is noted here that the rounded lateral edges of top 32 and cover 44 make it possible, under a restoring force exerted via the translation means such as described hereinafter, to "bring top 32 back down" into cover 44 when tray table 26 is being stored and top 32 is being "returned" into the cover.

FIGS. 8 to 10 more precisely illustrate means 46 controlling the translation of top 32 by sliding in cover 44.

These means 46 here are incorporated in cassette 38, of rigid PVC type.

Cassette 38 comprises a lower half-box 50 and an upper half-box 60 as shown in exploded view in FIG. 10.

Lower half-box 50 is fixed by screws at one end to mobile element 40, from which it extends perpendicularly to axis S.

It is also fixed to cover 44 by rivets, in such a way that it entrains this cover during the displacement of tray table 26 by mobile element 40.

Lower half-box 50 also comprises a groove 52 extending from its end fixed to mobile element 40 in the longitudinal axis of cassette 38 (horizontal axis perpendicular to S), and two guides 54 parallel to groove 52 over a large length of the cassette.

Groove 52 is provided to receive the rack mechanisms introduced hereafter, and for this purpose it has a variable width: wide on the side of mobile element 40 in order to receive two racks, and narrower toward the opposite end in order to receive a single rack.

Upper half-box 60 is fixed underneath main top 32 of tray table 26, for example by screws (via a plate 61).

Upper half-box 60 in turn comprises two grooves 62, substantially facing the two guides 54. When the two half-boxes 50 and 60 are closed together, guides 54 engage in corresponding grooves 62. In this way upper half-box 60 and top 32 integral therewith can slide laterally (perpendicular to axis S) relative to lower half-box 50 and mobile element 40.

One rack 56 is engaged in groove 52 of lower half-box 50 and is able to slide inside in the longitudinal direction of cassette 38 (perpendicular to S). A vertical finger 58 is fixed integrally at the end of rack 56 on the side of mobile element 40.

A corresponding rack 64 is fixed in upper half-box 60 and engages in groove 52 when cassette 38 is closed.

The two racks are interfaced by a toothed wheel 66. Thus, when rack 56 slides in corresponding groove 52, it drives toothed wheel 66 in rotation, which itself drives second rack 64 in translation in the opposite direction (together with the entire upper half box 60 and main top 32). The arrows shown in FIG. 10 illustrate the movement of the different parts during the extension of tray table 26 (change from P2 to P1).

In particular, toothed wheel 66 has two stages, one engaging in first rack 56 and the other in second rack 64 (groove 52 being sufficiently deep to receive both racks 56, 64, each at the respective stage of toothed wheel 66). In this way the travel of the second rack can be easily reduced or demultiplied according to that of the first rack. In particular, there is chosen a toothed wheel offering a ratio equal to 2: the travel of rack 56 causes a double travel of rack 64.

Returning to FIG. 8, external body 16 comprises a double vertical wall defining an internal space in which there is housed the displacement mechanism formed by mobile element 40 and rails 30. A perpendicular wall 70 closes off the double wall at the top. In particular, this wall 70 is parallel to rails 30, or in other words slightly inclined downward in the direction of seat 14. Slot 42 provided for the displacement of cassette 38 is machined in the external wall of body 16.

A non-traversing groove 72, in which finger 58 of cassette 38 comes to engage when tray table 26 is mounted on module 10, is machined in the lower surface of wall 70.

Groove 72 extends substantially over the same length as displacement groove 42, and in the direction of seat 14 it becomes progressively farther apart from the external wall in which groove 42 is machined. In particular, a lateral difference of 25 mm is provided between the two extreme positions.

In this way, when tray table 26 is pulled toward seat 14, the tray table and mobile element 40 slide on rails 30 toward the seat. At the same time, finger 58 becomes progressively farther apart, by 25 mm, from tray table 26 by virtue of groove 72, thus driving rack 56 in similar translation relative to lower half-box 50 (and groove 52) and driving toothed wheel 66 in rotation.

Because of the ratio of 2 of wheel 66, rack 64 then translates over a double distance, or in other words 50 mm, in the opposite direction, causing top 32 to slide out of cover 44, via the translation of upper half-box 60 integral with top 32, relative to lower half-box 50 integral with cover 44.

Correlatively, when tray table 26 is pushed toward storage housing 24, finger 58 and rack 56 translate progressively toward tray table 26. Rack 64 and top 32 then translate in the other direction, ensuring retraction of the latter into the interior of cover 44.

As a variant of groove 72, guide ramps provided on the lower face of wall 70 may be used.

The profile of groove 72 is chosen in particular to bring about a maximum lateral offset (25 mm in the example hereinabove), for a displacement of tray table 26 along axis S over a distance equal to the depth of casing 18. In this way, tray table 26 has a maximum useful surface as soon as it emerges from housing 24.

The second part of the profile of groove 72 is then straight, parallel to the displacement of tray table 26.

Seat modules 10 such as described hereinabove may also be integrated into a cabin configuration such as shown in FIG. 11, which shows only a central group of modules 10 in the aircraft cabin.

In this configuration, seat modules 10 are aligned one behind the other along longitudinal axis X of the aircraft. The central group is formed from two columns of modules 10 offset longitudinally by one half-length of module 10. In this way casing 18 of a module 10 offers a fixed tray table 20 for the neighboring passenger, at the height of his seat bottom 13. It is observed here that it is not the front passenger (in the column) who claims fixed tray table 20, but the passenger immediately in front in the neighboring column.

The different types of casing 18 mentioned in the foregoing (with or without fixed tray table 21, with foot support part 23 that may or may not jut out beyond casing 18) may be provided in this configuration, as may removable tray tables 26 such as described hereinabove.

In this cabin configuration, only modules 10 of the central cabin group thus claim a supplementary tray table 20 on the neighboring module. In fact, the lateral groups against the fuselage are generally constituted by a single module in width, which does not make it possible to claim a tray table on a neighboring module.

Thus it is noted that the cabin configuration shown in particular in FIG. 1, in which the modules form an angle with longitudinal axis X of the aircraft, makes it possible to offer this supplementary tray table to all seat modules, both in the central groups and lateral groups.

The foregoing examples are merely some embodiments of the invention, which is not limited thereto.

In particular, it is possible to simplify the mechanism for translation of top 32 by the use of a single rack integral with upper part 60 of cassette 38. The profile of groove 72 is then inverted: this groove progressively approaches the external wall during displacement toward the seat. Thus the finger on the single rack, the rack and top 32 are driven integrally to make this top slide in cover 44.

Furthermore, the invention, although described hereinabove in an aeronautic application, may be applied to any type of vehicle equipped with seats, for example a train, but also to seat modules disposed in buildings, for example in a waiting room or lounge.

The invention claimed is:

1. A seat tray table system comprising:
   a tray table including an upper surface, the tray table configured to be displaced along a longitudinal axis between at least two positions; and
   a translation mechanism that modifies, by transversal translation perpendicular to the longitudinal axis, exposed dimensions of the upper surface during displacement of the tray table between the at least two positions,
   wherein the translation mechanism modifies the exposed dimensions of the upper surface in response to the translation mechanism being moved along the longitudinal axis.

2. The system according to claim 1, wherein the translation mechanism is coupled to a displacement mechanism to displace the tray table such that the upper surface extends automatically during displacement of the tray table between the at least two positions.

3. The system according to claim 2, wherein the translation mechanism comprises a finger configured to engage in a groove provided on a support, along which the tray table is displaced between the at least two positions.

4. The system according to claim 2, wherein the tray table comprises a first tray table part and a second tray table part integral with the displacement mechanism along a support, the first tray table part sliding in the second tray table part.

5. The system according to claim 1, wherein the tray table is fixed to a displacement mechanism such that the upper surface of the tray table occupies a substantially horizontal position in the at least two positions.

6. The system according to claim 5, further comprising a guide to guide the tray table during its deployment, the guide being arranged to displace the upper surface vertically between the at least two positions.

7. The system according to claim 6, wherein the guide includes a plurality of rails.

8. The system according to claim 7, wherein each of the plurality of rails includes a plurality of straight slots, the plurality of straight slots configured to block the tray table in intermediate positions between the at least two positions.

9. The system according to claim 1, wherein, in one of the positions as a stored position, the tray table is stored in a housing provided in a cabinet having a fixed tray table on an upper surface thereof, the tray table having dimensions substantially identical to the fixed tray table, such that the tray table is underneath the fixed tray table in the stored position.

10. An aircraft comprising the system according to claim 1.

11. A seat tray table system comprising:
    a tray table including an upper surface, the tray table configured to be displaced along a longitudinal axis between at least two positions; and
    a translation mechanism that modifies, by transversal translation relative to the longitudinal axis, dimensions of the upper surface during displacement of the tray table between the at least two positions,
    wherein the translation mechanism comprises two racks coupled by a toothed wheel, the two racks being respectively integral with a movable part of the tray table and with an actuating member.

12. The system according to claim 11, wherein the toothed wheel is mounted on a second tray table part integral with a displacement mechanism to displace the tray table along a support, the movable tray table part sliding in the second tray table part.

* * * * *